(No Model.) 2 Sheets—Sheet 1.
H. E. EBERHARDT.
FRICTION CLUTCH.
No. 290,671. Patented Dec. 25, 1883.
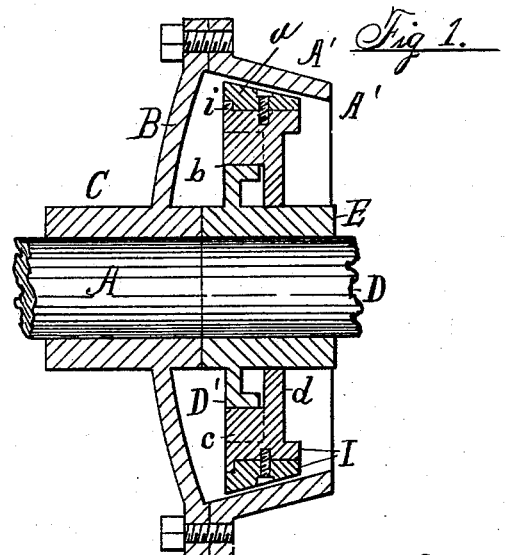
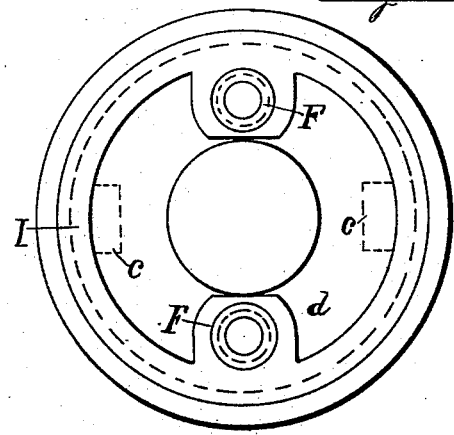
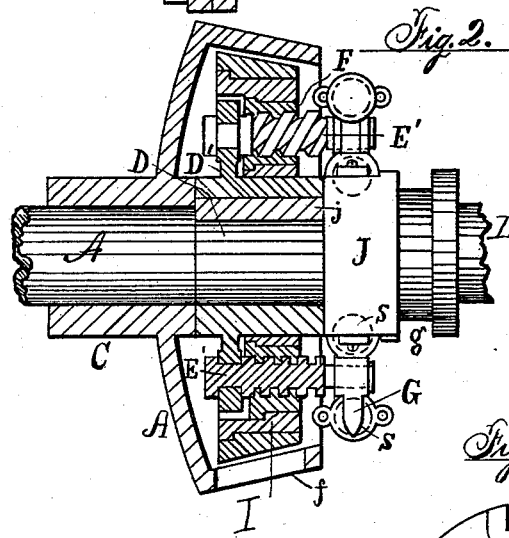
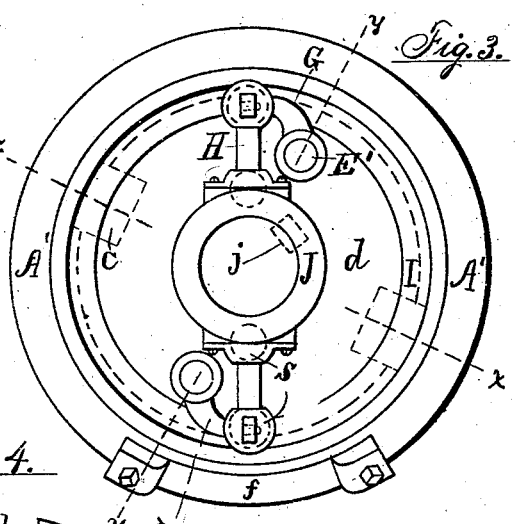
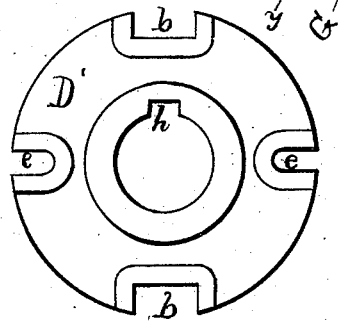
Attest:
W. F. D. Crane.
Henry Ruberath
Inventor.
H. E. Eberhardt per
Thos. S. Crane, atty.

(No Model.) 2 Sheets—Sheet 2.

H. E. EBERHARDT.
FRICTION CLUTCH.

No. 290,671. Patented Dec. 25, 1883.

Attest:
Fred. Hewitt
Henry Theberath

Inventor.
H. E. Eberhardt, per
Thos. S. Crane, Atty.

UNITED STATES PATENT OFFICE.

HENRY E. EBERHARDT, OF NEWARK, NEW JERSEY.

FRICTION-CLUTCH.

SPECIFICATION forming part of Letters Patent No. 290,671, dated December 25, 1883.

Application filed May 9, 1883. (No model.)

*To all whom it may concern:*

Be it known that I, HENRY E. EBERHARDT, a citizen of the United States, residing in the city of Newark, in Essex county, New Jersey, have invented certain new and useful Improvements in Friction-Couplings, fully described and represented in the following specification and the accompanying drawings, forming a part of the same.

This invention consists in an improved construction for a conical clutch-coupling, whereby very great power is secured to generate friction in a clutch of small diameter, and the strain or thrust of the cone is entirely limited to the rotating parts.

Figure 6:
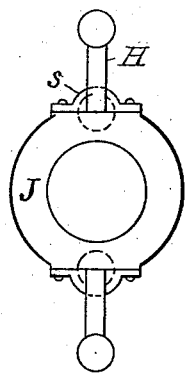
Figure 7:
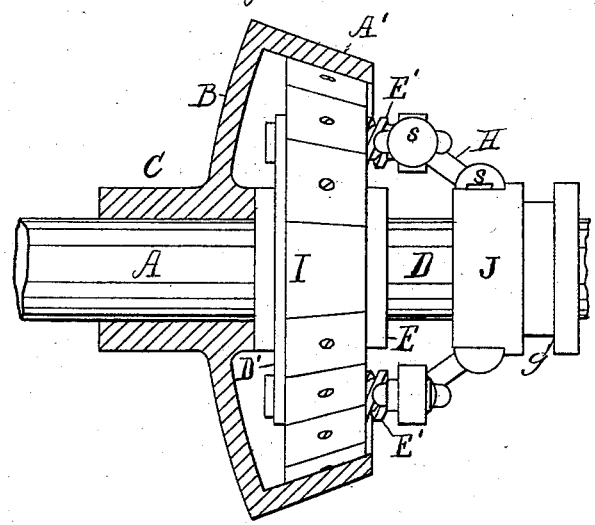
Figures 9, 10:
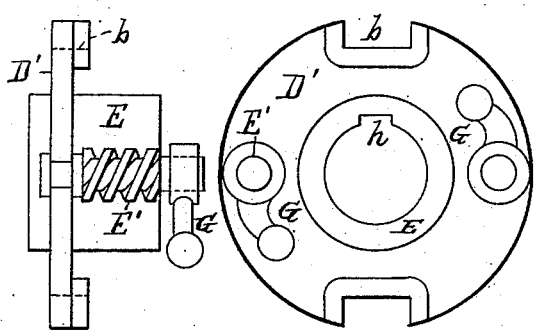
Figure 8:
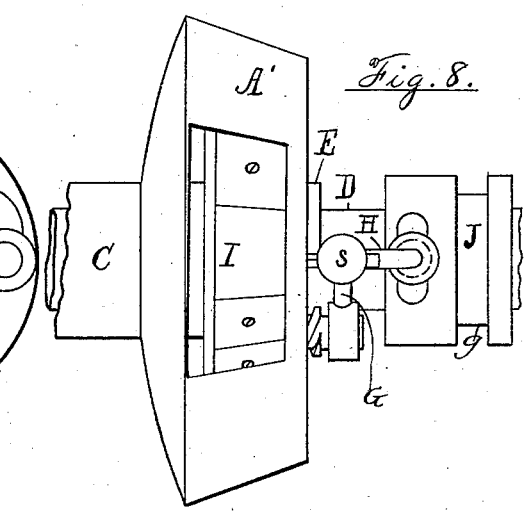

In the drawings, Figure 1 is a central section on line $x\,x$ in Fig. 3, and Fig. 2 is a section on line $y\,y$ in Fig. 3. Fig. 3 is an end view of the shaft D and the coupling, and Fig. 4 is an inside view of the plate D'. Fig. 5 is a similar view of the cone plate or ring. Fig. 6 is an end view of the sliding hub J and the links H, detached from the arms G. Fig. 7 is a side view of the entire clutch with the hub J drawn out, the shell A' being shown in section to expose the cone I. Fig. 8 is an edge view of the parts as shown in Fig. 7, the shell A' displaying the sections of wood upon the cone I through the opening represented in Fig. 2 at the lower side of the view, the section of the shell shown at $f$ in Fig. 3 being removed to exhibit the opening. Fig. 9 is a front view of the plate D', with the screws E' and arms G in the position shown in Fig. 7; and Fig. 10 is an edge view of the same parts detached from the rest of the coupling.

A is a shaft, which may be the driver or the driven, at pleasure.

B is a flange, secured to it by a hub, C, and carrying a hollow conical shell, A'.

D is the shaft, to be coupled or connected to A. D' is a plate secured to it by a hub, E, and I is a cone carried and driven by the plate, but arranged to slide upon it longitudinally to the shaft D. The shell A' is arranged to extend over the cone I upon the shaft D, and such longitudinal movement of the cone forces the latter into the shell, and connects the two shafts by the resulting friction. The plate D' has notches $b$ formed in its edge, into which lugs $c$, formed upon the inside of the cone-ring I, are fitted before the latter is turned smooth in the process of construction. The cone I is thus made concentric with the shaft, and may be further kept so by forming it with a central flange, $d$, fitted to the hub E, as in the construction shown in Fig. 1. The cone is provided with nuts F (see Figs. 2 and 5) at two opposite sides of the hub E, and two screws are inserted in the same and journaled in sockets $e$, formed in opposite edges of the plate D', as seen in Figs. 2 and 4. The screws are formed with a thread of heavy pitch, as shown in Figs. 2 and 10, and a very small rotation in their nuts therefore suffices to push the cone I away from the plate D' and into contact with the inner side of the shell A'. To rotate the screws, arms G are secured to their outer ends, and a hub, J, is mounted upon the shaft D and connected with the arms by links H. The screws are formed with collars to grip each side of the plate D', and the links H are connected with the arms G and hub J by ball-and-socket joints S, as shown in Figs. 2 and 3, to compensate for the opposite movement of the arms and the hub. The movement of the arms G is at right angles to the shaft D, while the hub J and links H move parallel to the shaft; but the ball-and-socket joints operate, when the hub J is drawn away from the hub E, to move the arms G simultaneously toward the center of the shaft, as shown in Figs. 7 and 9, which figures indicate the position of such parts when the hub J is moved out, and to turn the screws E' in the required manner. The hub J is provided with a groove, $g$, Figs. 2 and 7, for the application of a lever or other means to move it when required, and when thus moved the cone I may be forced into contact with the shell A', or drawn therefrom while the shaft and coupling are in motion, as is usual. The screws form such a connection between the plate D' and cone I that when they are turned in their nuts and sockets they force said pieces apart with sufficient force, while no thrust is communicated to parts outside of the coupling itself.

A wooden rim is preferable upon the cone I, and is shown in Fig. 1 at $a$, fitted upon an iron ring, having an annular rib or flange, $i$, to resist the thrust. The wood may be made in sections, as is common, and be secured to the iron base-ring by screws, as shown in Fig. 1.

To retain all the thrust of the frictional surfaces within the clutch or coupling, I form the outer shell, A', with its large end inward, and thus cause the pressure employed to react upon the joint between the hubs C and E. This construction requires that the shell A' should be loose from its flange, or removable, as shown in Fig. 1, to insert the inner cone, I; or the metallic part of the cone may be small enough to enter the mouth of the shell A', and the wooden facing be applied to it in sections through an aperture formed in the shell. In such case a section of the shell is made removable and bolted to its place, as shown at $f$ in Figs. 2 and 3. Such section would be applied to the shell before the interior was turned out smooth, and could then be replaced at any time without affecting the evenness of the inner surface.

The hub E is shown in Fig. 2 secured to the shaft D by a key, $j$, (seen in Fig. 3,) a key-way, $h$, being formed in the shaft and in the hub, as seen at $h$ in Figs. 4 and 9. The shaft A may be similarly secured, or either shaft may be fastened to the part of the coupling it is intended to revolve with, by other suitable means.

It will be seen from the construction described that the arrangement of the shell A', with its small end outward, directs all the thrust of the driving-cone I inward, the strain being transmitted by the plate D' to its hub, and from thence toward the hub of the shell itself. As the shell is rigidly connected with the hub C by bolting or casting to the flange B uniting them, the tension of the screws is entirely retained within the structure, when the cone is pressed against the shell, and no thrust is transmitted to the adjacent parts.

I therefore claim my invention, as follows:

1. The combination, with the conical shell A', secured to a shaft, A, by a flange, B, and hub C, of a driving-plate, D', secured to a shaft, D, by a hub, E, and carrying a longitudinally-movable cone, I, attached to the plate D' by driving-guides, and means, substantially as described, for moving the cone upon the plate, as and for the purpose set forth.

2. The combination, with the clutch-shell A', constructed as described, of the plate D', attached to the connecting-shaft and carrying the longitudinally-movable cone I, and the screws E', swiveled in the plate, the nuts F, attached to the cone, the arms G, links H, and sliding hub J, the whole arranged and operated as set forth.

3. The combination, with the longitudinally-movable cone I, of the annular flange $i$, the sectional wooden lagging $a$, and the inclosing-shell A', having a closed flange, B, at its large end, and constructed with an opening in the rim to insert the wooden lagging, as and for the purpose set forth.

4. The combination, with the movable cone operated by the screws E' and arms G, and the hub J, for operating the screws at right angles to its movement, of the connecting-links H, formed with ball-and-socket joints at the ends, as and for the purpose set forth.

5. The combination, in a conical friction-coupling, of a longitudinally-moving cone, screws to thrust the cone endwise, and means, substantially as described, for turning the screws by a sliding hub, substantially as set forth.

In testimony whereof I have hereunto set my hand in the presence of two subscribing witnesses.

HENRY E. EBERHARDT.

Witnesses:
   THOS. S. CRANE,
   W. F. D. CRANE.